Patented Jan. 9, 1934

1,942,838

UNITED STATES PATENT OFFICE 1,942,838

METHOD OF RECOVERING AMINES AND PHENOLS FROM THEIR AQUEOUS SOLUTIONS

Waldo L. Semon, Cuyahoga Falls, Ohio, assignor to The B. F. Goodrich Company, New York, N. Y., a corporation of New York No Drawing. Application August 22, 1928
Serial No. 301,439

17 Claims. (Cl. 260—130.5)

This invention relates to the art of manufacturing organic chemicals and has as its object to provide a method for the purification of certain aromatic compounds and particularly to provide a method for precipitating them from aqueous solution.

Many aromatic compounds, such as the aromatic amines, and the aromatic hydroxy compounds, known generically as phenols, are manufactured commercially in aqueous solution, or are purified from such a solution. However, these compounds are all more or less soluble, which makes quantitative recovery, and separation from impurities and by-products difficult and expensive. This invention, in brief, consists in precipitating the above-mentioned phenols and aromatic amines in the form of the substantially insoluble phenol-amine salts.

It is well-known that trivalent nitrogen compounds, such as amines, are capable of adding acids, or certain inorganic salts or organic compounds. For example, the formation of the hydrochlorides of amines is a well-known phenomenon, often useful in the separation or identification of such compounds. The addition compounds of amines with zinc chloride, gold chloride, platinum chloride, or with picric acid, etc. are also well-known. Less known, however, are the addition products of amines with phenols. Such addition products are crystalline substances, moderately stable when maintained dry and neutral, and are readily prepared by reacting the appropriate amine and phenol, preferably in equimolecular proportions, either in the solid or the molten state, or in solution in an appropriate solvent. It is to the precipitation of such addition products, or salts of amines and phenols, from aqueous solution that this invention particularly relates.

The aromatic amines, in general, have been prepared by the reduction in aqueous solution of the corresponding nitro compounds, purified either by steam distillation, which may entail a considerable loss of the amine by solution in the aqueous layer of the distillate, or by a solvent extraction, which is expensive and relatively inefficient. In accordance with the present invention they are precipitated by adding to the aqueous solution an equivalent amount or an excess of a phenol such as ordinary phenol (hydroxybenzene), but preferably a poly-hydroxy phenol or a phenol of higher molecular weight such as hydroquinone, naphthol, etc. The process is generally applicable to the precipitation of any more or less water-soluble aromatic amine, but is particularly valuable in the case of the amines which are so soluble that they do not separate from the solution after reduction is complete. For example, p-amino-dimethylaniline is made by reducing p-nitroso-dimethylaniline with iron and hydrochloric acid. The p-amino-dimethylaniline remains in solution after neutralization and filtration of the mixture, and is customarily extracted with benzene. However, if an equivalent amount of beta-naphthol is added, the p-amino-dimethylaniline is quantitatively precipitated as the the beta-naphtholate. The constituents of this salt may be again separated if desired by adding an acid and extracting the amine salt with water, or by adding an alkali such as sodium hydroxide to fix the naphthol, and distilling off the amine. However, for many purposes it may be desirable to use the naphthol amine salt directly rather than to attempt to separate the naphthol and amine.

As another example of an application of this method, p-phenylenediamine has heretofore been reacted with an excess of beta-naphthol to form symmetrical di-beta-naphthyl-p-phenylene-diamine. However, the p-phenylene-diamine is quite expensive, because of the difficulty of recovering it from the aqueous solution after the preparation by the usual method of reducing the corresponding nitro azo compound. By using the process of this invention, the p-phenylene-diamine may be quantitatively recovered from the filtered, neutral solution by adding the desired excess of beta-naphthol. The mixture of the p-phenylene-diamine-di-beta-naphtholate with the excess beta-naphthol may be reacted directly in the well known manner to form the aforementioned di-beta-naphthyl-p-phenylene-diamine.

If it is desired to obtain a precipitate of the pure phenol-amine salt, not containing an excess of either material, an excess of a soluble phenol, such as resorcinol, hydroquinone, or even phenol (hydroxybenzene) may be added to the solution of the amine. The excess will then remain in solution and will not contaminate the precipitate.

As indicated above, this method is equally applicable to the precipitation of phenols from solution by adding amines to the solution. For example, hydroquinone may be precipitated from its water solution by adding an amine, such as aniline. The constituents of the hydroquinone-aniline salt may conveniently be separated by fractional distillation. The salt is decomposed by heat and the aniline distills off first.

The symmetrical dinaphthyl-p-phenylene-diamine, referred to above, has also been prepared by reacting naphthylamine with hydroquinone. But since the process of manufacturing hydroquinone involves separation from an aqueous solution, the hydroquinone may be precipitated from the solution by the method of this invention as the naphthylamine salt by adding the appropriate amount of naphthylamine to the solution, and the dinaphthyl-p-phenylene-diamine may then be prepared directly from this salt in the well known manner by simply heating. The symmetrical diphenyl-p-phenylene-diamine may similarly be prepared by heating the dianiline salt of hydroquinone.

It is evident, from the above examples, that it is frequently advantageous to precipitate water-soluble amines or phenols as the phenol-amine salts, and especially so when it is possible to use the salt so formed directly, without separation of the ingredients. In addition to the substances mentioned any of the following phenols may be employed to form typical insoluble salts with the following amines, or vice-versa:

| Phenols | Amines |
|---|---|
| Phenol | Aniline |
| Nitrophenols | Amino-phenols |
| Chlorphenols | Nitraniline |
| Resorcinol | Toluidines, xylidines |
| Catechol | Diamino benzenes (phenylene-diamines) |
| Hydroquinone (quinol) | |
| Pyrogallol | P-amino-diphenylamine |
| Naphthols | P-amino-dimethylaniline |
| Substituted naphthols | Naphthylamines |
| Dihydroxynaphthalenes | Diaminonaphthalenes |
| Hydroxyanthracenes | Benzidine |
| Hydroxyanthraquinones (alizarine, purpurin, etc.) | Diamino diphenylemethane |

However, it will be found most advantageous to carry out this invention with phenols and amines of higher molecular weight such as poly-hydroxy or poly-amino compounds, or derivatives of condensed ring nuclei, which form salts of comparatively high melting points and almost completely insoluble in water. The salts of low molecular weight and low melting points, such as the phenol-aniline salt, tend to absorb water with the formation of liquids which are less readily separated from the water than solid precipitates.

While specific examples have been given, and certain phenols and amines have been mentioned as being capable of forming phenol-amine salts, it is not intended to limit this invention thereto, but to include in general the precipitation of substantially insoluble salts formed by the addition of aromatic hydroxy-compounds to primary aromatic amino-compounds.

I claim:

1. The method of removing phenols from aqueous solution which comprises adding a primary aromatic amine and recovering the precipitated phenol-amine salt.

2. The method of removing phenols from a water solution, which comprises adding aniline and recovering the precipitated phenol-aniline salt.

3. The method of recovering phenols which comprises adding a primary aromatic amine to a water solution of the phenol, recovering the phenol in the form of the insoluble phenol-amine salt, and separating the phenol and the amine contained in the recovered salt.

4. The method of recovering polyhydroxy benzenes which comprises adding an aromatic amine to an aqueous solution of a poly-hydroxy benzene, and recovering the poly-hydroxy-benzene in the form of an insoluble salt with the amine.

5. The method of recovering hydroquinone which comprises dissolving the crude hydroquinone in water, adding aniline, and recovering the hydroquinone in the form of an insoluble salt with the aniline.

6. The method of recovering hydroquinone which comprises dissolving the crude hydroquinone in water, adding aniline, recovering the insoluble aniline-hydroquinone salt, and recovering the hydroquinone by subjecting the salt to fractional distillation.

7. The method which comprises mixing a primary aromatic amine and a phenol, at least one of which prior to the admixture exists in a state of solution in water, and separating the precipitated phenol-amine salt from the aqueous solution.

8. The method which comprises mixing aqueous solutions of a primary aromatic amine and a phenol, and separating the precipitated phenol-amine salt from the aqueous solution.

9. The method of removing mono-hydroxy phenols derived from hydrocarbons of the benzene homologous series from aqueous solution which comprises adding an aromatic primary amine and recovering the precipitated salt of the amine and the hydroxy compound.

10. The method of removing phenol from aqueous solution which comprises adding an aromatic primary amine and removing the precipitated phenol-amine salt.

11. The method of removing phenol from aqueous solution which comprises adding aniline and removing the precipitated phenol-aniline salt.

12. The method of removing primary aromatic amines from aqueous solution, which comprises adding a phenol and removing the precipitated phenol-amine salt.

13. The method of removing primary aromatic amines from aqueous solution, which comprises adding a naphthol and removing the precipitated naphthol-amine salt.

14. The method of removing primary aromatic amines from aqueous solution which comprises adding beta-naphthol and recovering the precipitated beta-naphthol-amine salt.

15. The method of removing p-phenylene-diamine from aqueous solution which comprises adding beta-naphthol and recovering the precipitated p-phenylene-diamine-di-beta-naphtholate.

16. The method of recovering primary aromatic amines from aqueous solution which comprises adding a phenol to precipitate an insoluble phenolamine salt, recovering the salt, and separating the amine from the phenol in the said salt.

17. The method of recovering primary aromatic amines from aqueous solution which comprises adding a naphthol to precipitate an insoluble naphthol-amine salt, recovering the salt and separating the amine from the naphthol in the said salt.

WALDO L. SEMON.

CERTIFICATE OF CORRECTION.

Patent No. 1,942,838. January 9, 1934.

WALDO L. SEMON.

It is hereby certified that error appears in the above numbered patent requiring correction as follows: Page 1, line 84, after the word "nitro" insert the word or; and that the said Letters Patent should be read with this correction therein that the same may conform to the record of the case in the Patent Office.

Signed and sealed this 5th day of February, A. D. 1935.

Leslie Frazer (Seal) Acting Commissioner of Patents.